(12) United States Patent
Uno (10) Patent No.: US 7,954,239 B2
(45) Date of Patent: Jun. 7, 2011

(54) METHOD OF MANUFACTURING A TORQUE LIMITER DEVICE

(75) Inventor: Kozo Uno, Osaka (JP)

(73) Assignee: Exedy Corporation, Osaka (JP)

( * ) Notice: Subject to any disclaimer, the term of this patent is extended or adjusted under 35 U.S.C. 154(b) by 1155 days.

(21) Appl. No.: 11/631,675

(22) PCT Filed: Jul. 6, 2005

(86) PCT No.: PCT/JP2005/012475
§ 371 (c)(1),
(2), (4) Date: Jan. 5, 2007

(87) PCT Pub. No.: WO2006/006467
PCT Pub. Date: Jan. 19, 2006

(65) Prior Publication Data
US 2008/0072427 A1 Mar. 27, 2008

(30) Foreign Application Priority Data
Jul. 12, 2004 (JP) ................. 2004-204659

(51) Int. Cl.
*B21D 39/00* (2006.01)
*B23P 15/14* (2006.01)
*F16F 15/12* (2006.01)

(52) U.S. Cl. ...... 29/893.1; 29/407.02; 29/469; 74/574.3

(58) Field of Classification Search ............... 29/407.01, 29/407.02, 407.03, 407.05, 896.91, 469, 29/893.1; 464/64.1; 74/574.3; 192/212
See application file for complete search history.

(56) References Cited

U.S. PATENT DOCUMENTS

| 5,433,666 A | * | 7/1995 | Graton et al. ............... 464/68.5 |
| 5,634,543 A | * | 6/1997 | Hashimoto et al. ...... 192/213.21 |
| 2002/0194949 A1 | | 12/2002 | Kintou et al. |
| 2004/0045152 A1 | * | 3/2004 | Uno ............................... 29/469 |

FOREIGN PATENT DOCUMENTS

| EP | 0947719 A2 | 10/1999 |
| JP | 07-127656 A | 5/1995 |
| JP | 2000-153767 A | 6/2000 |
| JP | 2002-039210 A | 2/2002 |
| JP | 2003-013992 A | 1/2003 |
| JP | 2003-065355 A | 3/2003 |

* cited by examiner

Primary Examiner — Jermie E Cozart
(74) Attorney, Agent, or Firm — Global IP Counselors, LLP (57) ABSTRACT

A manufacturing method that can stabilize an operation torque of a torque limiter device in a manufacturing stage is provided. The method of manufacturing the torque limiter device 1 includes an assembling step S1 of attaching a clutch disk 13 and a damper mechanism 16 to a spline hub 15, and attaching a friction facing 21 to the clutch disk 13; an assembling step S2 of attaching a transmission torque limiting portion 6 to the friction facing 21; and a grinding step S4 of supplying a torque to at least one of the transmission torque limiting portion 6 and the spline hub 15 to rotate them relatively to each other.

20 Claims, 5 Drawing Sheets

METHOD OF MANUFACTURING A TORQUE LIMITER DEVICE

TECHNICAL FIELD

The invention relates to a method of manufacturing a torque limiter device, and particularly to a method of manufacturing a torque limiter device having a damper mechanism.

BACKGROUND ART

In vehicles, a torque limiter device that interrupts a torque of a predetermined value or greater may be arranged between an engine and a transmission in view of breakage of the transmission and the like due to an excessive torque transmitted from the engine. This torque limiter device is configured, e.g., such that one or more friction facings are held between a pair of plates with a predetermined holding force, and input and output sides of the device are coupled to a flywheel, i.e., a member on the engine side, and an input shaft or the like on a transmission side, respectively.

This kind of torque limiter device has a drive plate that is provided at its radially outer portion with a frictional coupling portion held between a pair of plates with a predetermined holding force, a driven-side member coupled to an input shaft of a transmission, and a spring damper arranged between them (see, e.g., patent reference 1). In this device, the paired plates holding the frictional coupling portion therebetween (or a damper cover arranged on a radially outer portion of the frictional coupling portion) is coupled to a flywheel. Conical springs bias one of the plates toward the frictional coupling portion to apply the holding force to the frictional coupling portion.

In this torque limiter device, the torque of the engine is transmitted from the flywheel via the frictional coupling portion to the drive plate, and is further transmitted therefrom via the spring damper to the driven-side member and the input shaft of the transmission. When the torque provided from the engine exceeds a predetermined torque, sliding occurs between the frictional coupling portion and the plates. Thereby, a torque exceeding the predetermined torque is not transmitted toward the transmission, and breakage of the transmission due to transmission of the excessive torque can be prevented.

[Patent Reference 1] Japanese Laid-Open Patent Publication No. 2002-39210

DISCLOSURE OF THE INVENTION

The torque limiter devices described above undergo an inspection after assembly for managing or controlling actual operating torques (i.e., operation torques). In the inspection, the torque limiter device is actually supplied with a torque, and the operation torque in the actual operation is measured. The measured value of the operation torque is compared with a lower limit of a designed operation torque (i.e., allowed operation torque), and the torque limiter device is accepted when the measured value of the operation torque is equal to or larger than the allowed transmission torque.

Figure 1:
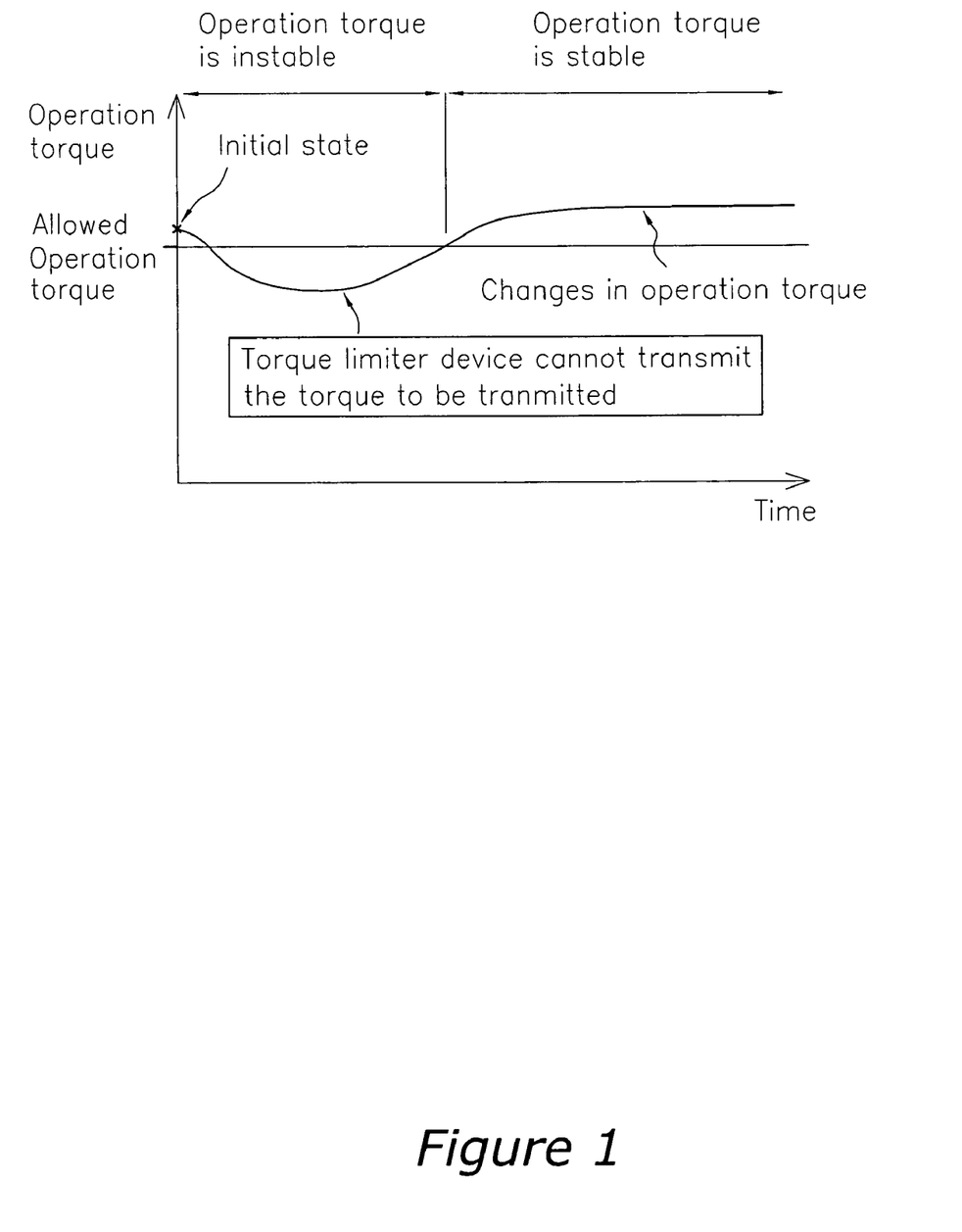
FIG. 1 illustrates a tendency of variations in operation torque of a torque limiter device.

However, operation torque is often unstable in torque limiter devices that are in the initial state after the assembly. A test was conducted to determine a tendency of variations occurring in operation torque when starting use of the torque limiter devices, and a variation tendency illustrated in FIG. 1 was obtained. In the graph of FIG. 1, the ordinate gives the operation torque, and the abscissa gives the time. In the graph of FIG. 1, even when the operation torque exceeds the allowed transmission torque after assembly, the operation torque will temporarily lower below the allowed transmission torque according to use of the device. When the device is further used, the operation torque rises above the allowed transmission torque, and then becomes stable.

Accordingly, even when no problem was found in operation torque according to the inspection, the operation torque may become lower than the allowed transmission torque when starting the use. It can be considered that these variations in operation torque are due to the fact that the state of contact between friction surfaces of the frictional coupling portion and the plates as well as the biasing force of conical springs and the like are not stable during the initial state after the assembly. The variations in operation torque can be reduced by devising the assembly operation itself, e.g., to improve the assembly precision, but such reduction can be performed only to a limited extent. When the operation torque lowers excessively, the torque limiter device cannot transmit the torque to be transmitted, and thus may cause trouble when driving the vehicle. Therefore, it is extremely important to stabilize the operation torque in the manufacturing stage.

An object of the invention is to provide a manufacturing method that can stabilize the operation torque of the torque limiter device.

In a method of manufacturing a torque limiter device according to a first aspect of the present invention, a torque limiter device includes an input plate having a frictional coupling portion fixed to its radially outer portion; an output member engaged with an output shaft; a damper portion elastically coupling the input plate and the output member together in a circumferential direction; and a transmission torque limiting portion attached to an input member, holding the frictional coupling portion between a pair of plates and limiting a torque transmitted from the input member to the output shaft.

This manufacturing method includes a first step of attaching the input plate and the damper portion to the output member, and attaching the frictional coupling portion to the input plate; a second step of attaching the transmission torque limiting portion to the frictional coupling portion; and a third step of supplying a torque to at least one of the transmission torque limiting portion and the output member to rotate the transmission torque limiting portion and the output member relatively to each other.

This manufacturing method can cause sliding between the frictional coupling portion and the plate pair, and can stabilize a contact state of friction surfaces and a holding force of the plates. Consequently, a friction resistance on the friction surfaces becomes stable, and the operation torque of the torque limiter device can be stabilized in the manufacturing state.

According to a second aspect of the present invention, the method of manufacturing the torque limiter device according to the first aspect is configured such that the relative rotation between the transmission torque control portion and the output member in the third step is performed at a predetermined relative speed.

Since this manufacturing method causes the relative rotation at the predetermined relative speed, a constant relative speed is achieved in the product, and the state of the friction surfaces can be stable.

According to a third aspect of the present application, the method of manufacturing the torque limiter device according to the first or second aspect is configured such that the relative rotation in the third step is repeated intermittently.

This manufacturing method can operate the torque limiter device multiple times, and can reliably stabilize the operation torque in each product.

According to a fourth aspect of the present invention, the method of manufacturing the torque limiter device according to the third aspect is configured such that the intermittent relative rotation in the third step is performed with a predetermined rotation time and a predetermined stop time.

This manufacturing method can cause a constant amount of sliding in one cycle formed of one rotation time and one stop time, and can stabilize the sliding quantity in each product.

According to a fifth aspect of the present invention, the method of manufacturing the torque limiter device according to the third or fourth aspect is configured such that the relative rotation in the third step is repeated a predetermined number of times.

Since this manufacturing method can cause each product, i.e., each torque limiter device to operate a constant number of times, the operation torque of each product can be further and reliably stabilized.

According to a sixth aspect of the present invention, the method of manufacturing the torque limiter device according to any one of the first to fifth aspects further includes a fourth step of supplying, after the third step, the input torque to at least one of the transmission torque limiting portion and the output member, and measuring the input torque at the time of operation of the torque limiter device.

This manufacturing method can determine the final operation torque of the torque limiter device, and can determine pass/fail of the operation torque.

According to a seventh aspect of the present invention, the method of manufacturing the torque limiter device according to the sixth aspect further includes a fifth step of adjusting, after the fourth step, settings of the relative speed, the rotation time, the stop time and the number of times to achieve the input torque exhibiting the measured value equal to or larger than the predetermined torque.

By changing the various settings in this manufacturing method, the operation torque of the torque limiter device can be adjusted to exceed reliably the allowed transmission torque.

According to an eighth aspect of the present invention, the method of manufacturing the torque limiter device according to any one of the preceding first to seventh aspects is configured such that the transmission torque limiting portion has an annular cover member arranged radially outside the frictional coupling portion and attached to the input member, a pair of annular plates arranged radially inside the cover member to hold the frictional coupling portion between the same, and a biasing member to apply a predetermined holding force to the paired annular plates.

This manufacturing method can likewise stabilize the operation torque in the torque limiter device of which the transmission torque limiting portion has the annular cover member, annular plate and biasing member.

The manufacturing method according to the invention can stabilize the operation torque of the torque limiter device.

BRIEF DESCRIPTION OF REFERENCE NUMBERS

1 torque limiter device
2 flywheel
2a fixed member
2b fixing bolt
3 input shaft
3a input member
3b spline portion
5 clutch disk assembly
6 transmission torque limiting portion
13 clutch disk
15 spline hub
21 friction facing
30 first plate
31 second plate
32 conical spring
33 cover member
40 grinding device
S1, S2 assembly step
S3 grinding step
S4 operation torque measuring step
S5 adjusting step

EMBODIMENTS OF THE INVENTION

Embodiments of the invention will now be described with reference to the drawings.

1. Structure of Torque Limiter Device

Figure 2:
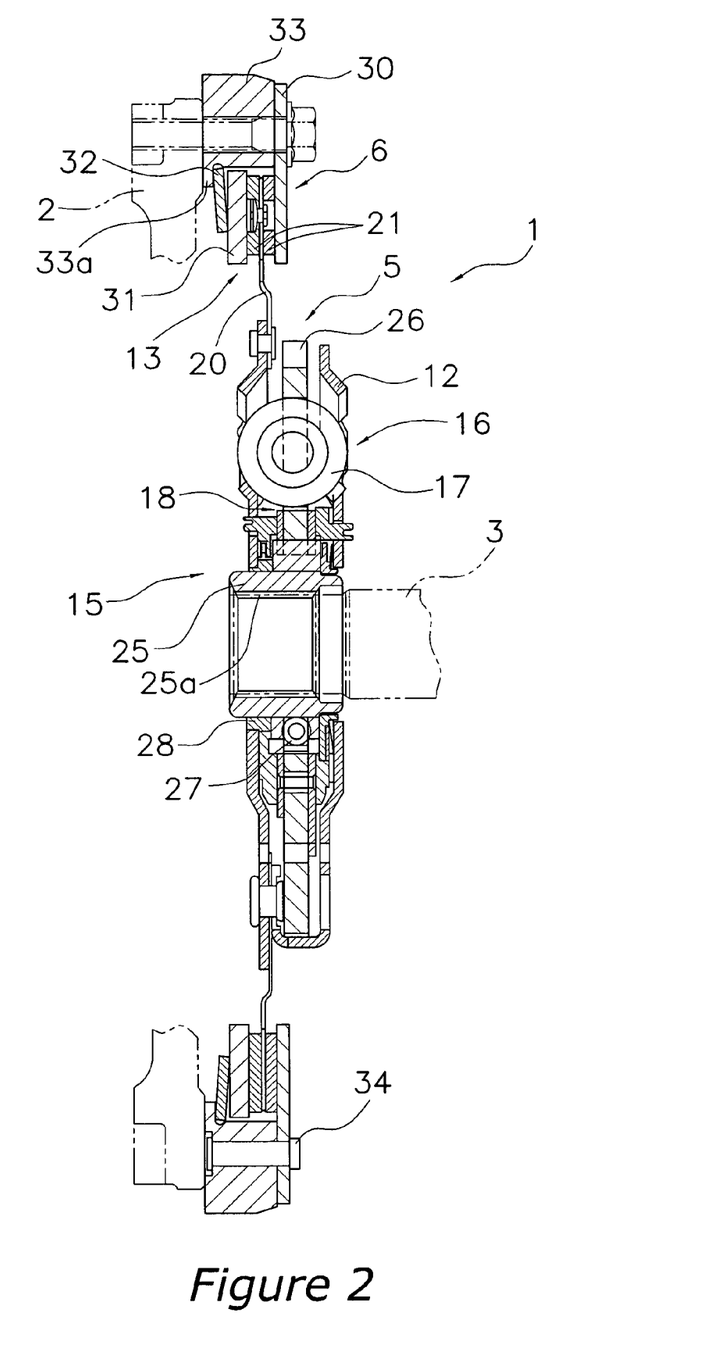
FIG. 2 is a cross section of the torque limiter device used in an embodiment of the invention.

FIG. 2 is a cross section of a torque limiter device used in an embodiment of the invention. In FIG. 2, an engine and a flywheel 2 are arranged on the left side, and a transmission (not shown) is arranged on the right side.

The torque limiter device 1 is arranged between the flywheel 2 and an input shaft 3 of the transmission to limit a torque transmitted from the engine to the transmission. This torque limiter device 1 has a clutch disk assembly 5 and a transmission torque limiting portion 6 including a clutch disk (frictional coupling portion) of the clutch disk assembly 5. Structures of various portions will now be described.

(1) Clutch Disk Assembly

The clutch disk assembly 5 is primarily formed of a clutch plate 11, a retaining plate 12 and a clutch disk 13, which serve as an input rotary member, as well as a spline hub 15 serving as an output rotary member and a damper mechanism 16 formed between the input and output rotary members.

The clutch and retaining plates 11 and 12 are formed of, e.g., annular members prepared by sheet metal working, and are axially spaced from each other. The clutch and retaining plates 11 and 12 are respectively arranged on the engine side and the transmission side. The clutch and retaining plates 11 and 12 are fixed together to rotate with each other. Each of the clutch and retaining plates 1 and 12 is provided at its radially outer portion with four windows that are circumferentially equally spaced from each other, and these windows hold torsion springs 17 that will be described later. Each of the clutch and retaining plates 11 and 12 is provided with a central aperture.

The clutch disk 13 has a cushioning plate 20 fixed to the radially outer portion of the clutch plate 11, and also has friction facings 21 fixed to the opposite surfaces of the cushioning plate 20, respectively. This clutch disk 13 forms the transmission torque limiting portion 6 that will be described later.

The spline hub 15 is formed of an axially extending cylindrical boss 25 and a disk-like hub flange 26 extending radially from the boss 25. The boss 25 and the hub flange 26 are respectively made of independent members, and are circumferentially coupled together by torsion springs 27 of a small diameter such that they are elastically coupled within a predetermined angular range, and are rigidly coupled in a range exceeding the predetermined angular range. The boss 25 is provided at its inner periphery with a spline aperture 25a engaged with the input shaft 3 of the transmission. The hub flange 26 is provided with a plurality of circumferentially spaced recesses.

The opposite end portions of the boss 25 of the spline hub 15 are respectively fitted into the central apertures of the clutch and retaining plates 11 and 12, and a bushing 28 is arranged between the inner peripheral surface of the aperture of the clutch plate 11 and the outer peripheral surface of the boss 15.

The damper mechanism 16 is employed to transmit the torque between the input and output rotary members and to absorb and to damp torsional vibrations between them, and has the plurality of torsion springs 17 and a hysteresis generating mechanism 18. The plurality of torsion springs 17 is accommodated and held in the windows of the clutch and retaining plates 11 and 12 as well as the recesses of the hub flange 26.

(2) Transmission Torque Limiting Portion

The transmission torque limiting portion 6 has the clutch disk 13 of the clutch disk assembly 5, first and second plates 30 and 31 arranged to hold axially and respectively the friction facings 21 of the clutch disk 13 from the opposite sides, a conical spring 32 applying a holding force to the pair of plates 30 and 31, and an annular cover member 33 arranged radially outside the clutch disk 13.

The first plate 30 is fixed to the side surface on the transmission side of the cover member 33 by rivets 34. The inner peripheral portion of the cover member 33 is provided at its end on the engine side with an engagement projection 33a projecting radially inward. The second plate 31 is arranged radially inside the cover member 33 to hold the friction facings 21 between the first and second plates 30 and 31, and the conical spring 32 is arranged in a compressed state between the second plate 31 and the engagement projection 33a. According to this structure, the biasing force of the conical spring 32, the friction coefficient of the friction facing 21 and the effective radius of the friction portion determine a transmittable torque. When the torque supplied from the engine exceeds this transmittable torque, sliding occurs on the friction portion to limit the transmission torque to a predetermined value.

2. Method of Manufacturing the Torque Limiter Device

Description will now be given on steps of a method of manufacturing the torque limiter device 1 having the above structures.

(1) Flow of Manufacturing Steps

Figure 3:
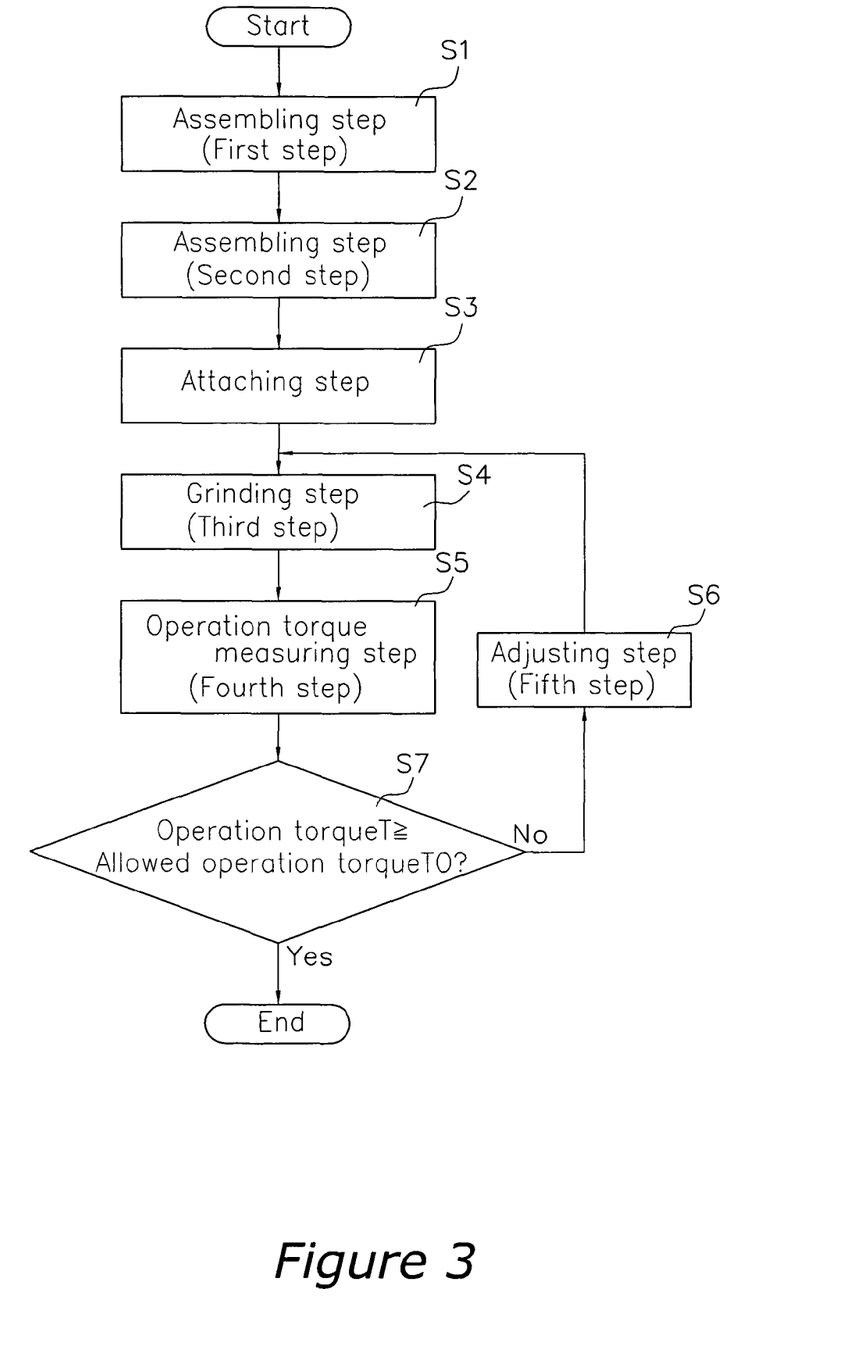
FIG. 3 shows a manufacturing step of the torque limiter device.

FIG. 3 illustrates manufacturing steps of the torque limiter device. First, assembling steps S1 and S2 are executed to assemble the respective parts into the torque limiter device 1. In an attaching step S3, the torque limiter device 1 is attached to a grinding device (to be described later) to perform grinding on the assembled torque limiter device 1. In a subsequent grinding step S4, the grinding device performs the grinding on the torque limiter device 1. In an operation torque measuring step S5 after the end of the grinding, the operation torque is measured, and is compared with the allowed transmission torque. In the operation torque measuring step S5, when the measured value of the operation torque is lower than the allowed transmission torque, respective settings for the grinding are adjusted in an adjusting step S6, and the grinding step S4 and the operation torque measuring step S5 are repeated. Each of the steps will now be described in detail.

(2) Assembling Step S1 (First Step)

In the assembling step S1, the clutch disk assembly 5 is assembled. The foregoing spline hub 15, clutch plate 11, retaining plate 12, clutch disk 13 and damper mechanism 16 are successively assembled into the assembly 5. The manner of this assembling operation is substantially the same as that for the conventional clutch disk assembly, and therefore is not described in detail.

(3) Assembling Step S2 (Second Step)

In the next assembling step S2, the transmission torque limiting portion 6 is attached to the clutch disk assembly 5. First, the clutch disk 13 is attached between the first and second plates 30 and 31. The cover member 33 is fixed to the first plate 30 by the bolts with conical spring 32 kept in contact with the second plate 31. The outer peripheral portion of the conical spring 32 is located between the engagement portion 33a of the cover member 33 and the second plate 31. The conical spring 32 is compressed between the engagement projection 33a and the second plate 31, and therefore applies a biasing force to the clutch disk 13. The clutch disk 13 is held between the first and second plates 30 and 31.

(4) Structure of Grinding Device

Figure 4:
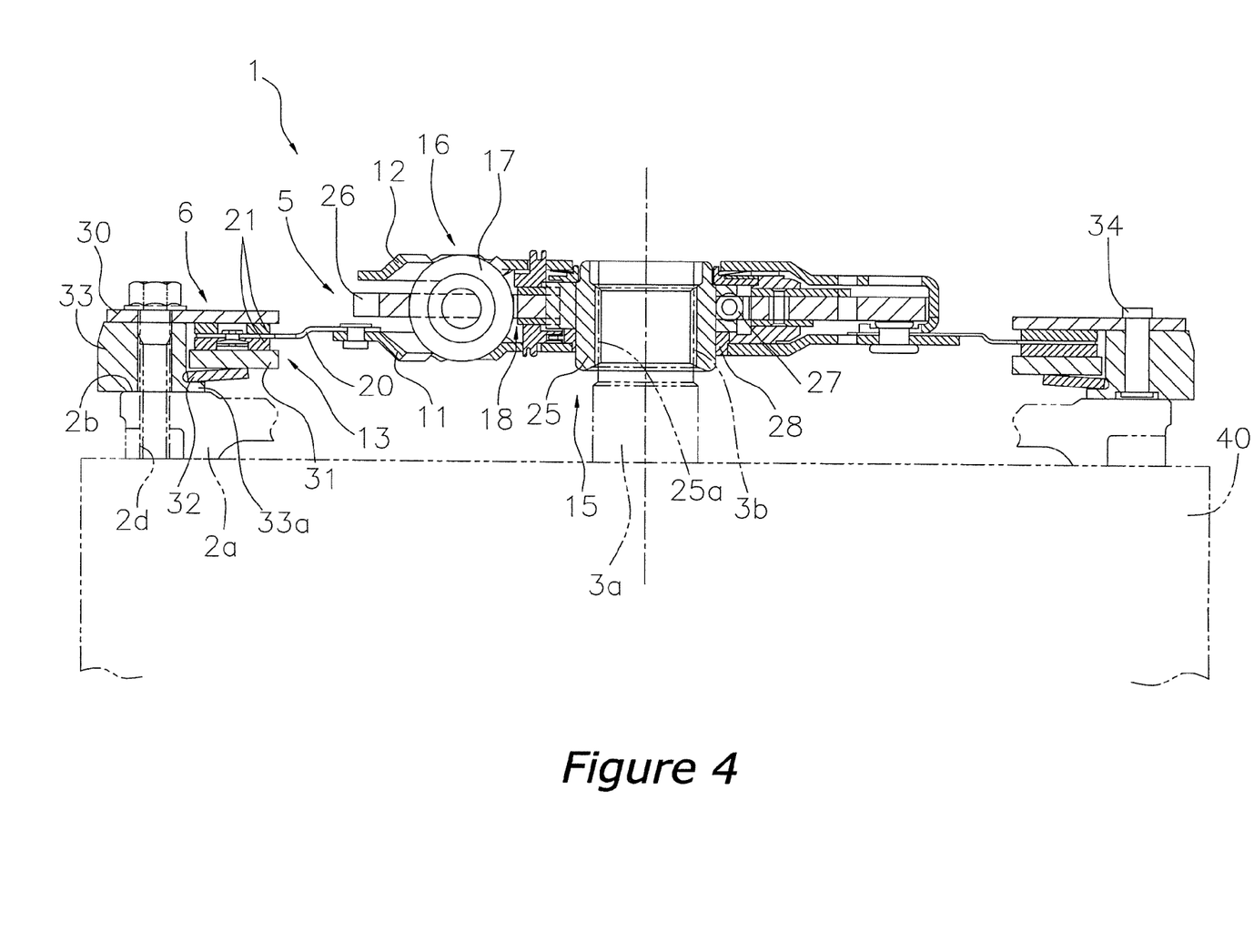
FIG. 4 shows the torque limiter device in an attached state.

Description will now be given on the grinding device used in the manufacturing method according to the invention. FIG. 4 shows the torque limiter device in an attached state. A grinding device 40 includes an input member 3a corresponding to the input shaft 3, and a fixing member 2a corresponding to the flywheel 2. The input member 3a is employed to provide torque to the torque limiter device 1, and extends vertically upward from the grinding device 40. The input member 3a is provided at its end portion with a splined portion 3b for spline-engagement with the spline aperture 25a of the torque limiter device 1.

The fixing member 2a is employed to fix unrotatably the cover member 33, and has an annular form concentric with the input member 3a. The fixing member 2a is arranged such that its contact surface 2b for contact with the cover member 33 forms the upper surface. The fixing member 2a is provided at its radially outer portion with screw apertures 2d to fix the cover member 33 of the torque limiter device 1 by fixing bolts 20.

The input member 3a is coupled to an electric motor or the like, e.g., via a gear or the like, and can rotate at a constant relative speed with respect to the fixing member 2a. The grinding device 40 can automatically adjust the input torque so that the input member 3a can rotate at the constant rotation speed. The grinding device 40 can measure the input torque provided via the input member 3a, i.e., the operation torque.

(5) Attaching Step S3

In the attaching step S3, the torque limiter device 1 is attached to the grinding device 40 already described to perform the grinding in the grinding step S4 to be described later. More specifically, as shown in FIG. 4, the spline aperture 25a of the clutch disk 13 is spline-engaged with the splined portion 3b of the input member 3a, and torque limiter device 1 is placed on the contact surface 2b of the fixing member 2a. The cover member 33 is fixed to the fixing member 2a by the plurality of fixing bolts 2c.

(6) Grinding Step S4 (Third Step)

The grinding step S4 is executed to stabilize the operation torque by actually operating the torque limiter device 1 using the grinding device 40. As illustrated in FIG. 1, the operation torque of the torque limiter device 1 temporarily lowers after the start of use, and tends to become lower than the allowed transmission torque. After the torque limiter device 1 is operated multiple times, the operation torque rises above the allowed transmission torque, and then becomes stable. In the grinding step S4, therefore, the torque limiter device 1 is operated multiple times until the operation torque exceeds the allowed transmission torque and enters the stable range.

To operate the torque limiter device 1 multiple times, the clutch disk 13 is supplied with the torque via the input member 3a, and is intermittently rotated with respect to the transmission torque limiting portion 6. The intermittent relative rotation is performed by presetting the relative speed, the rotation time, the stop time and the number of repetitions in the grinding device 40. The grinding device 40 is configured to allow easy change of these setting values.

Figure 5:
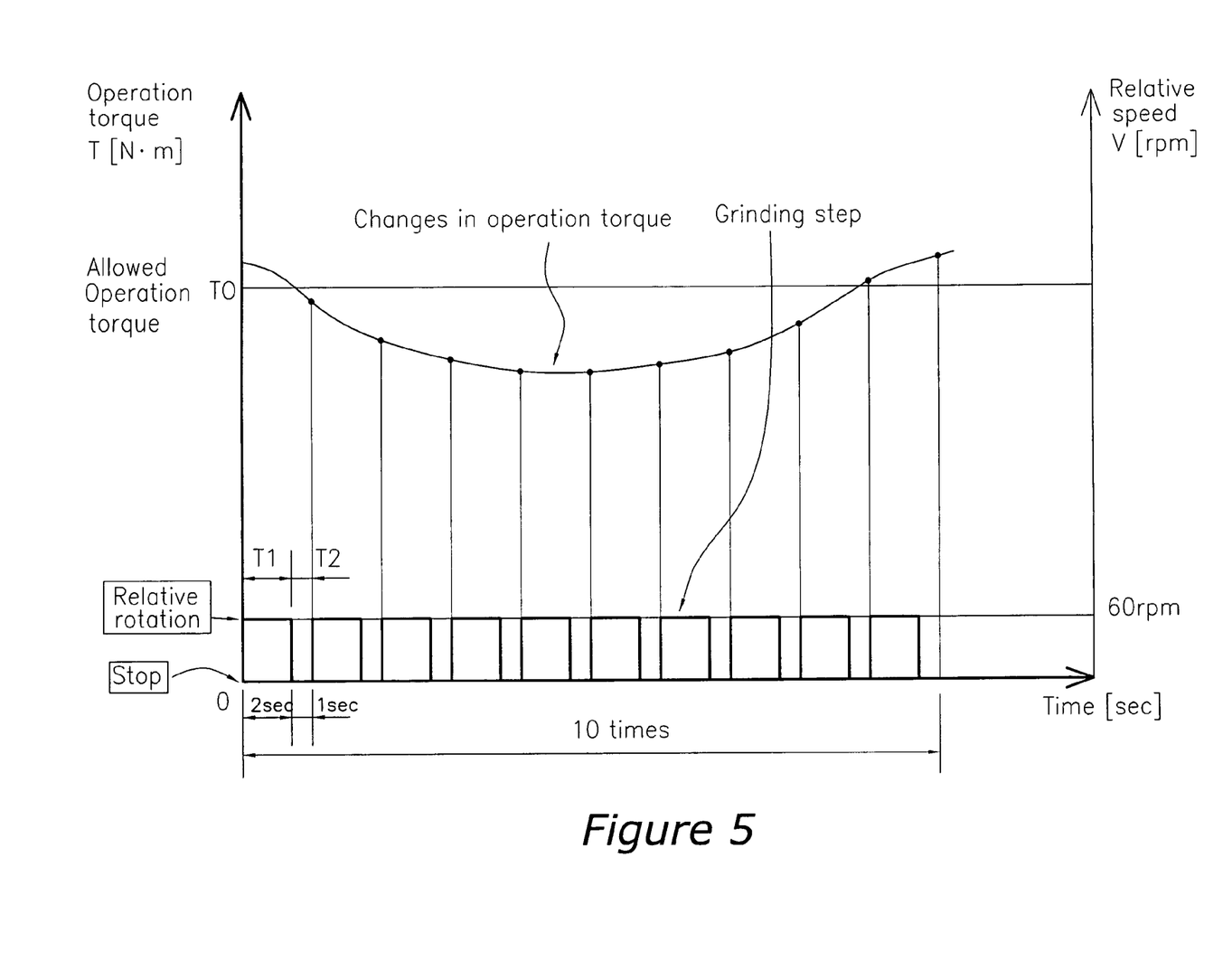
FIG. 5 is a graph illustrating a grinding step and changes in operation torque.

FIG. 5 is a graph illustrating the grinding step and the changes in operation torque. In FIG. 5, the abscissa gives the time (sec), the first ordinate gives the operation torque T (N·m) and the second ordinate gives the relative speed V (m/sec). The lower portion of FIG. 5 illustrates relative rotations of the torque limiter device 1, and the upper portion illustrates the changes in operation torque over time caused by the relative rotations. The relative rotations are performed with the relative speed of V (rpm), the rotation time of T1 (sec), the stop time of T2 (sec) and the repetition number of N. These settings values are determined based on results of tests that were performed in advance. In this embodiment, it is assumed that V=60 (rpm), T1 =(2 (sec), T2=1 (sec) and N=10 (times).

As illustrated in the lower portion of FIG. 5, the relative rotation continues for 2 seconds while maintaining 60 rpm, and then stops for one second. This relative rotation and stopping are performed in one cycle, and this cycle is repeated 10 times in total. Thereby, as illustrated in the upper portion of FIG. 5, the operation torque T that was larger than the allowed transmission torque T0 becomes lower than the allowed transmission torque T0 when the relative rotation is repeated, and will exceed the allowed transmission torque T0 when the relative rotation is further repeated. After the end of the grinding step S4, the operation torque T becomes stable and keeps the value exceeding the allowed transmission torque T0.

(7) Operation Torque Measuring Step S5 (Fourth Step)

The operation torque measuring step S5 is executed to measure the operation torque of the torque limiter device 1 that underwent the grinding in the grinding step S4. The operation torque is measured with grinding larger than the allowed transmission torque in the step S7, the torque limiter device 1 is accepted, and the processing ends.

(8) Adjusting Step S6 (Fifth Step)

Only when it is determined in the step S7 that the measured value of the operation torque T is smaller than the allowed transmission torque T0, the adjusting step S6 is executed to change the setting values such as the rotation speed. Then, the grinding step S4 and the operation torque measuring step S5 are executed. Finally, when the measured value of the operation torque T becomes equal to or larger than the allowed transmission torque T0, the torque limiter device 1 is removed from the grinding device 40, and the manufacturing process ends.

3. Operation and Effect

The operations and effects of the manufacturing method according to the invention can be summarized as follows.

According to this manufacturing method, since the torque is supplied to the clutch disk 13 via the input member 3a in the grinding step S4, it is possible to cause the sliding between the friction facings 21 and the paired, i.e., first and second plates 30 and 31 so that the contact state of the friction surfaces and the biasing force of the conical spring 32 can be stable. Consequently, the friction resistances on the friction surfaces are stable so that the operation torque of the torque limiter device 1 can be stabilized in the manufacturing stage. Since the relative rotation is performed at the predetermined relative speed, the constant relative speed is achieved in the product, and the state of the friction surfaces can be stable.

According to this manufacturing method, since the relative rotation is intermittently performed in the grinding step S4, the torque limiter device 1 can operate multiple times so that the operation torque can be reliably stabilized in each product. Since the rotation and stop times of the relative rotation are constant, the amount of sliding with respect to the friction surface can be stable in each product. Further, the relative rotation is repeated a predetermined number of times so that the number of operations of each product is constant and the operation torque of each product can be further stabilized.

According to this manufacturing method, the grinding of the friction surfaces is performed in the grinding step S4, and then the operation torque is measured by supplying the input torque to the torque limiter device 1 again in the operation torque measuring step S5 so that the final operation torque can be confirmed, and it is possible to determine pass/fail of the operation torque. In the operation torque measuring step S6, the settings are changed when the operation torque measured in the operation torque measuring step S5 is smaller than the allowed transmission torque. Therefore, the operation torque of the torque limiter device 1 can be reliably adjusted to be equal to or larger than the allowed transmission torque.

Owing to the above, the manufacturing method according to the invention can reliably stabilize the operation torque of the torque limiter device 1 in the manufacturing stage.

4. Other Embodiments

The invention is not restricted to the foregoing embodiment, and various changes and modifications can be performed within the spirit and scope of the present invention.

Other embodiments of the invention are as follows.

(1) Setting Values

The respective setting values (V, T1, T2 and N) of the invention depend on the specifications of the torque limiter device 1, and therefore are determined based on results of tests that are performed for each kind of products. Accordingly, the setting values are not restricted to those in the embodiment.

(2) Structure of Torque Limiter Device

The torque limiter device according to the invention has the structure shown in FIG. 2, but may have another structure. The manufacturing method according to the invention can stabilize the operation torque of torque limiter devices other than that in FIG. 2.

Industrially Applicability

The invention can be effectively applied to the manufacturing method of the torque limiter device and particularly to the manufacturing method of the torque limiter device having the damper mechanism.

What is claimed is:

1. A method of manufacturing a torque limiter device configured to limit torque between a flywheel and a transmission, the method comprising:

preparing a clutch disk assembly and a transmission torque limiting portion, the clutch disk assembly including an input plate, an output member, and a damper portion, the input plate including a frictional coupling portion, fixing the frictional coupling portion to a radially outer portion of the input plate;

engaging the output member with an output shaft transferring the torque to the transmission;

configuring the damper portion to couple elastically the input plate and the output member in a circumferential direction;

attaching the transmission torque limiting portion to an input member of the transmission, the transmission torque limiting portion holding the frictional coupling portion between a pair of plates of the clutch and limiting the torque transmitted from the input member to the output shaft;

attaching the input plate and the damper portion to the output member;

attaching the frictional coupling portion to the input plate;

attaching the transmission torque limiting portion to the frictional coupling portion; and supplying a provisional torque to at least one of the transmission torque limiting portion and the output member to rotate one of the transmission torque limiting portion and the output member relatively to the other, before attaching the frictional coupling portion to the input plate and before engaging the output member with an output shaft transferring the torque to the transmission.

2. The method of manufacturing the torque limiter device according to claim 1, wherein
when supplying the provisional torque to at least one of the transmission torque limiting portion and the output member is performed, relative rotation is performed at a predetermined relative speed.

3. The method of manufacturing the torque limiter device according to claim 2, wherein
when supplying the provisional torque to at least one of the transmission torque limiting portion and the output member is performed, relative rotation is repeated intermittently.

4. The method of manufacturing the torque limiter device according to claim 3, wherein
when supplying the provisional torque to at least one of the transmission torque limiting portion and the output member is performed, the relative rotation is repeated a predetermined number of times.

5. The method of manufacturing the torque limiter device according to claim 4, further comprising
measuring the provisional torque at the time of operation of the torque limiter device.

6. The method of manufacturing the torque limiter device according to claim 5, further comprising
after supplying the provisional torque to at least one of the transmission torque limiting portion and the output member, and measuring the provisional torque, adjusting the relative speed, rotation time, stop time, and the number of times to achieve the provisional torque exhibiting measured value equal to or larger than predetermined torque.

7. The method of manufacturing the torque limiter device according to claim 3, wherein
when supplying provisional torque to at least one of the transmission torque limiting portion and the output member is performed, the intermittent relative rotation is performed with a predetermined rotation time and a predetermined stop time.

8. The method of manufacturing the torque limiter device according to claim 7, wherein
when supplying provisional torque to at least one of the transmission torque limiting portion and the output member is performed, the relative rotation is repeated a predetermined number of times.

9. The method of manufacturing the torque limiter device according to claim 8, further comprising
measuring the provisional torque at the time of operation of the torque limiter device.

10. The method of manufacturing the torque limiter device according to claim 9, further comprising
after supplying the provisional torque to at least one of the transmission torque limiting portion and the output member, and measuring the provisional torque, adjusting the relative speed, the rotation time, the stop time, and the number of times to achieve the provisional torque exhibiting measured value equal to or larger than predetermined torque.

11. The method of manufacturing the torque limiter device according claim 10, wherein
the transmission torque limiting portion has
an annular cover member arranged radially outside the frictional coupling portion and attached to the input member,
a pair of annular plates arranged radially inside the cover member configured to hold the frictional coupling portion between the pair of annular plates, and
a biasing member configured to apply a predetermined holding force to the pair of annular plates.

12. The method of manufacturing the torque limiter device according to claim 1, wherein
when supplying the provisional torque to at least one of the transmission torque limiting portion and the output member is performed, relative rotation is repeated intermittently.

13. The method of manufacturing the torque limiter device according to claim 12, wherein
when supplying the provisional torque to at least one of the transmission torque limiting portion and the output member is performed, the intermittent relative rotation is performed with a predetermined rotation time and a predetermined stop time.

14. The method of manufacturing the torque limiter device according to claim 13, wherein
when supplying the provisional torque to at least one of the transmission torque limiting portion and the output member is performed, the relative rotation is repeated a predetermined number of times.

15. The method of manufacturing the torque limiter device according to claim 12, wherein
when supplying the provisional torque to at least one of the transmission torque limiting portion and the output member is performed, the relative rotation is repeated a predetermined number of times.

16. The method of manufacturing the torque limiter device according to claim 15, further comprising
measuring the provisional torque at the time of operation of the torque limiter device.

17. The method of manufacturing the torque limiter device according to claim 16, further comprising
after supplying the provisional torque to at least one of the transmission torque limiting portion and the output member, and measuring the provisional torque, adjusting relative speed, rotation time, stop time, and a number of times to achieve the provisional torque exhibiting measured value equal to or larger than the predetermined torque.

18. The method of manufacturing the torque limiter device according to claim 1, further comprising
measuring the provisional torque at the time of operation of the torque limiter device.

19. The method of manufacturing the torque limiter device according to claim 18, further comprising
after supplying the provisional torque to at least one of the transmission torque limiting portion and the output member, and measuring the provisional torque, adjusting relative speed, rotation time, stop time, and a number of times to achieve the provisional torque exhibiting measured value equal to or larger than predetermined torque.

20. The method of manufacturing the torque limiter device according claim 19, wherein
the transmission torque limiting portion has
an annular cover member arranged radially outside the frictional coupling portion and attached to the input member,
a pair of annular plates arranged radially inside the cover member configured to hold the frictional coupling portion between the pair of annular plates, and
a biasing member configured to apply a predetermined holding force to the pair of annular plates.

* * * * *